United States Patent [19]

Yamada

[11] Patent Number: 4,988,267
[45] Date of Patent: Jan. 29, 1991

[54] ELECTROMAGNETIC PUMP

[75] Inventor: Sadayoshi Yamada, Zama, Japan

[73] Assignee: Toshiba Kikai Kabushiki Kaisha, Tokyo, Japan

[21] Appl. No.: 270,688

[22] Filed: Nov. 14, 1988

[30] Foreign Application Priority Data

Nov. 12, 1987 [JP] Japan .................. 62-284225

[51] Int. Cl.$^5$ ............................ H02N 4/20
[52] U.S. Cl. ........................ 417/50; 310/11
[58] Field of Search ............ 417/50; 310/11

[56] References Cited

U.S. PATENT DOCUMENTS

| 2,786,416 | 9/1954 | Fenemore | 417/50 |
| 2,929,326 | 6/1955 | Ingels | 417/50 |
| 4,212,592 | 7/1980 | Olich et al. | 417/50 |

FOREIGN PATENT DOCUMENTS

| 1917067 | 1/1970 | Fed. Rep. of Germany | 417/50 |
| 0017507 | 2/1979 | Japan | 417/50 |
| 0018965 | 1/1987 | Japan | 417/50 |
| 0266251 | 5/1988 | PCT Int'l Appl. | 417/50 |

OTHER PUBLICATIONS

Bamji, P. J. F., "Unconventional Electrical Machine for Circulating Molten Metal", Electric Power Applications, May 1978, vol. 1, No. 2, pp. 45–53.

I. Boldea and S. A. NAsar, *Linear Motion Electromagnetic Systems*, John Wiley & Sons, Inc., U.S.A. 1985, pp. 134 & 132.

Primary Examiner—Leonard E. Smith
Assistant Examiner—David W. Scheuermann
Attorney, Agent, or Firm—Banner, Birch, McKie & Beckett

[57] ABSTRACT

An electromagnetic pump for use in a pressure-feed device for feeding molten metal from a furnace to a casting machine includes a core protection tube housing a cylindrical core of ceramic for protecting the core from erosion by contact with molten metal, a duct accommodating the core protection tube with a space defined between the duct and the core protection tube, and a coil disposed around the duct and energizable for generating a moving magnetic field to feed molten metal filled in the space. The core protection tube is supported in the duct by a pair of support members having confronting end faces, respectively, fitted in the respective opposite ends of the core protection tube for holding opposite ends of the core.

17 Claims, 5 Drawing Sheets

ELECTROMAGNETIC PUMP

BACKGROUND OF THE INVENTION

The present invention relates to an electromagnetic pump, and more particularly to an electromagnetic pump for use in a pressure-feed device for supplying molten metal to a casting machine or the like.

One conventional pressure-feed device employing an electromagnetic pump is illustrated in FIGS. 1 and 2 of the accompanying drawings.

The conventional pressure-feed device includes a fixed furnace 2 for holding molten metal, and a supply pipe system coupled to the furnace 2 and comprising a horizontal duct 4 heated to a high temperature, a coupling 6, a vertical duct 8, an elbow 10, and a nozzle 12 with a mouthpiece 14 connected thereto. The vertical duct 8, the nozzle 12, and the mouthpiece 14 are each swingable. The components of the supply pipe system are joined through spherical surfaces to compensate for heat-induced elongation, the spherical surfaces being sealed by heat-resistant gaskets.

A coil 16 is disposed around the duct 4. As shown in FIG. 2, a core protection tube 18 is fixed to and horizontally supported on one end of the coupling 6, and extends coaxially into the duct 4. The core protection tube 18 and the duct 4 define a space 20 therebetween. A core 22 made of a magnetic material is horizontally supported in the core protection tube 18 by means of a core holder 26 with one end thereof secured to a support plate 24 attached to the core protection tube 18.

When an electric current is passed through the coil 16 to produce a moving magnetic field, molten metal filled in the space 20 is supplied through the supply pipe system to the mouthpiece 14.

FIGS. 3 and 4 illustrate another conventional pressure-feed device. Those parts shown in FIGS. 3 and 4 which are identical or correspond to those shown in FIGS. 1 and 2 are denoted by identical reference numerals, and will not be described in detail.

The pressure-feed device shown in FIGS. 3 and 4 includes a furnace 28 movable in the directions of the arrow A by a cylinder 30. A duct 32 and a nozzle 34 which are connected to the furnace 28 are horizontally aligned with each other. As shown in FIG. 4, the nozzle 34 and the duct 32 are interconnected by a coupling 36 of ceramic having a molten metal passage 36a defined therein and a core protection tube 38. The core protection tube 38 has a protective tube member 38a supported horizontally in the duct 32 with a space 40 defined between the inner peripheral wall surface of the duct 32 and the protective tube member 38a. A core 22 is horizontally supported in the protective tube member 38a by the core holder 42.

When the coil 16 of FIGS. 3 and 4 is energized, molten metal from the furnace 28 is fed through the duct 32 and the nozzle 34 to the mouthpiece 14.

In the conventional electromagnetic pumps shown in FIGS. 1 through 4, the cores 22 are protected from erosion by the core protection tubes 18, 38. The electromagnetic pump illustrated in FIG. 1 is made up of many parts, and includes a total of seven sealed regions where the joined ends of the parts are sealed. Since the furnace 2 and the mouthpiece 14 are fixed in position, it is quite difficult to assemble the electromagnetic pump of FIGS. 1 and 2. Moreover, the electromagnetic pump tends to suffer molten metal leakage due to possible errors in assembly.

The electromagnetic pump shown in FIGS. 3 and 4 has a fewer number of sealing regions since it only requires five regions to be sealed. However, the electromagnetic pump is very expensive to manufacture because the coupling 36 and the core protection tube 38 have molten metal passages that must be carefully manufactured through complex machining processes.

SUMMARY OF THE INVENTION

It is a principal object of the present invention to provide an electromagnetic pump which protects a core from molten metal, is constructed from a reduced number of parts, has a simplified configuration, requires a reduced number of sealed regions, suffers no molten metal leakage, and can be assembled and maintained easily.

Another object of the present invention is to provide an electromagnetic pump comprising a cylindrical core made of a magnetic material, a core protection tube housing the cylindrical core for protecting the core from erosion by contact with molten metal, a duct accommodating the core protection tube with a space defined between the duct and the core protection tube, a coil disposed around the duct and energizable for generating a moving magnetic field to feed molten metal filled in the space, and a pair of support members supporting the core protection tube in the duct and having confronting end faces, respectively, for holding opposite ends of the core.

Still another object of the present invention is to provide an electromagnetic pump wherein the core protection tube comprises a pipe with the space defined between the pipe and the duct, the support members being fitted in the duct and having openings for passage of the molten metal therethrough and projections fitted respectively in opposite ends of the core protection tube.

Yet another object of the present invention is to provide an electromagnetic pump wherein the core protection tube and the support members jointly define a core storage region therebetween, with gaps left axially and diametrically between the core and the core storage region.

Yet still another object of the present invention is to provide an electromagnetic pump wherein the core protection tube and the support members jointly define a core storage region therebetween, with gaps left axially or diametrically between the core and the core storage region.

A further object of the present invention is to provide an electromagnetic pump wherein the core protection tube and the support members are integrally constructed as a unitary structure, the unitary structure having an opening defined in an end thereof corresponding to one of the support members for passage therethrough of the core, and further including a plug detachably mounted in the opening.

A still further object of the present invention is to provide an electromagnetic pump wherein the core protection tube, the support members, and the plug jointly define a core storage region therebetween, with gaps left axially and diametrically between the core and the core storage region.

A yet further object of the present invention is to provide an electromagnetic pump wherein the core protection tube, the support members, and the plug jointly define a core storage region therebetween, with gaps left axially or diametrically between the core and the core storage region.

A yet still further object of the present invention is to provide an electromagnetic pump wherein the core protection tube and the support members are made of ceramic.

Another object of the present invention is to provide an electromagnetic pump, further comprising a nozzle in contact with the duct wherein the nozzle is smaller in diameter than the duct and wherein the nozzle and the duct together define a supply pipe for passage of the molten material.

Still another object of the present invention is to provide an electromagnetic pump wherein the nozzle and the duct are constructed as a unitary structure.

Yet another object of the present invention is to provide an electromagnetic pump wherein the support members comprise central axial projections and having a plurality of through holes defined axially therethrough and equally angularly spaced around the central axial projections.

Yet still another object of the present invention is to provide an electromagnetic pump wherein the through holes comprise circular openings.

A further object of the present invention is to provide an electromagnetic pump wherein the through holes comprise arcuate openings.

A still further object of the present invention is to provide an electromagnetic pump wherein the support members comprise central axial projections and having equally angularly spaced radial arms disposed about the central axial projections.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
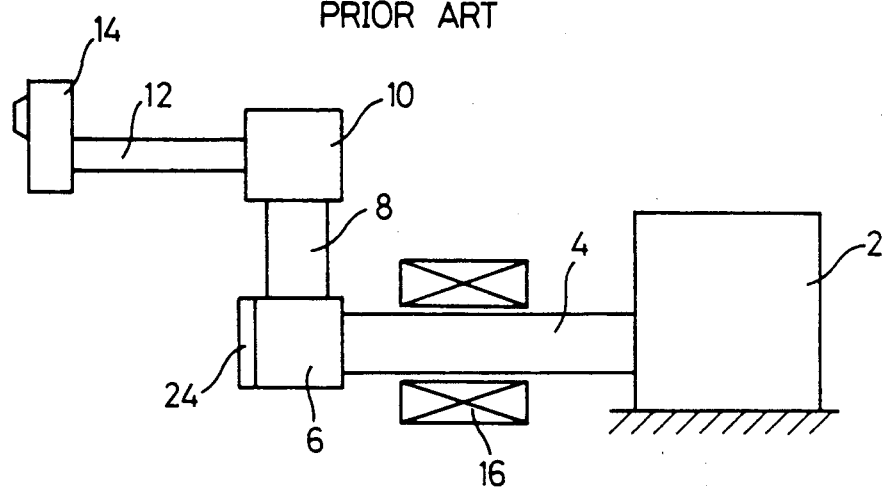
FIGS. 1 and 2 are schematic side elevational and enlarged fragmentary vertical cross-sectional views of a conventional pressure-feed device with an electromagnetic pump incorporated therein.
Figure 2:
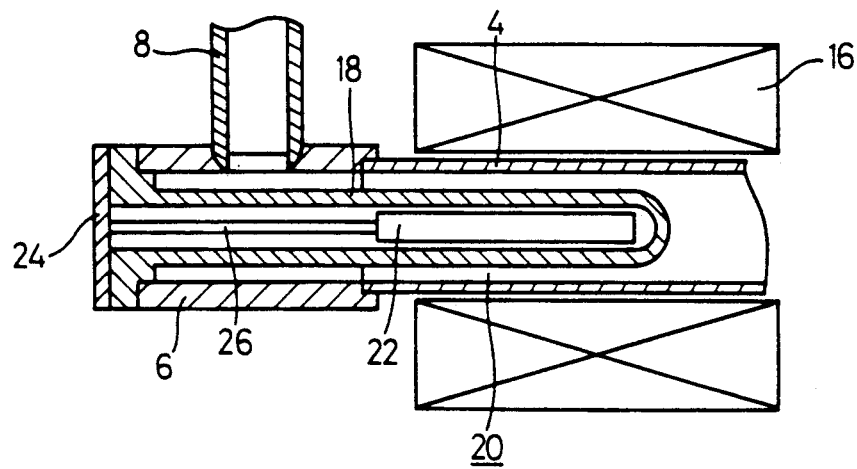
Figure 3:
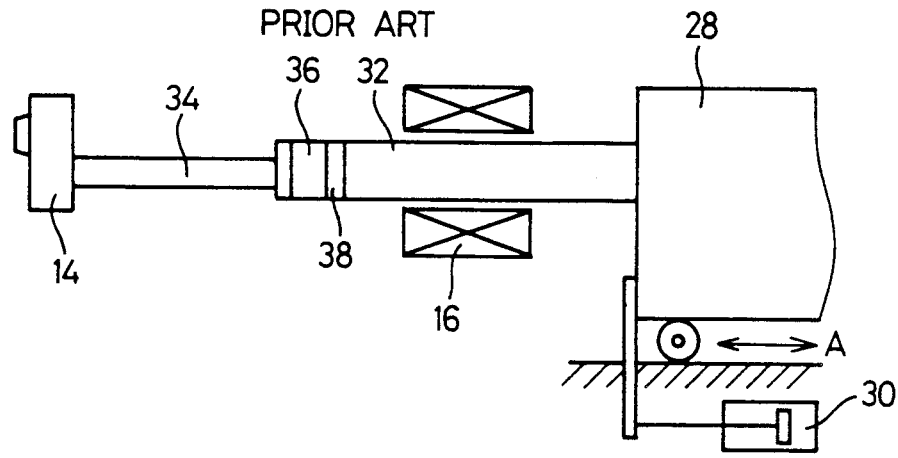
FIGS. 3 and 4 are schematic side elevational and enlarged fragmentary vertical cross-sectional views of another conventional pressure-feed device with an electromagnetic pump incorporated therein.
Figure 4:
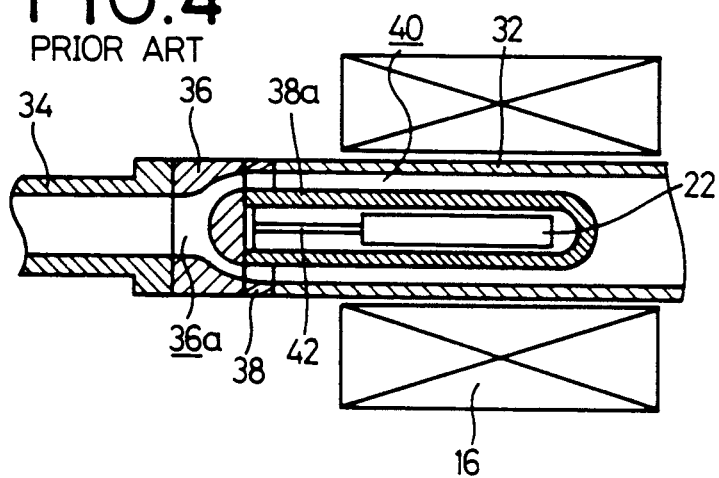
Figure 5:
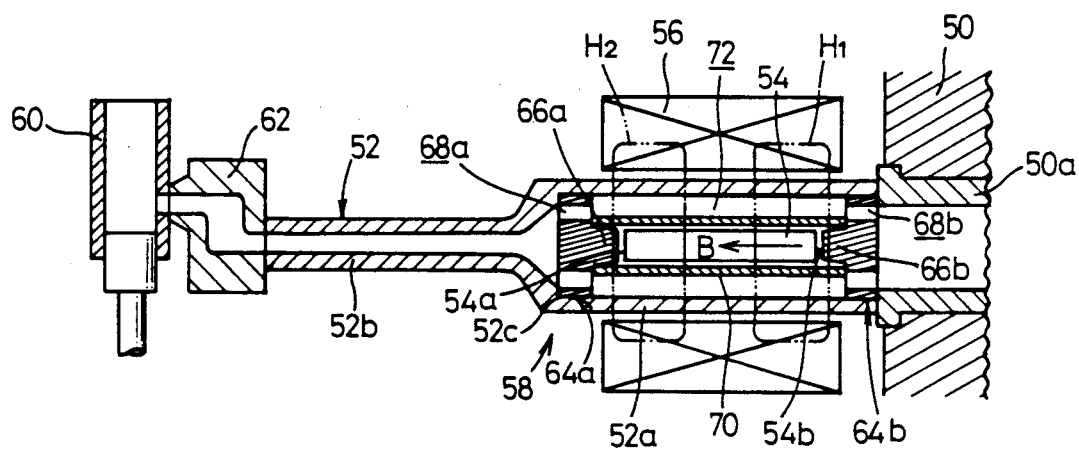
FIG. 5 is a fragmentary vertical cross-sectional view of a pressure-feed device including an electromagnetic pump according to the present invention.

FIG. 5 shows a pressure-feed device incorporating an electromagnetic pump according to an embodiment of the present invention.

The pressure-feed device essentially comprises a furnace 50 (only fragmentarily shown) for holding molten metal such as a molten aluminum alloy and discharging the molten metal from an outlet tube 50a, a supply pipe 52 having one end intimately connected to the outlet tube 50a, an electromagnetic pump 58 including a core 54 housed in the supply pipe 52 and a coil 56 disposed around the supply pipe 52, and a mouthpiece 62 coupled to the other end of the supply pipe 52 for feeding the molten metal into an injection sleeve 60 of a casting machine (not shown).

The supply pipe 52 is of a unitary cylindrical structure of a nonmagnetic material including two portions having different diameters, i.e., a larger-diameter duct 52a and a smaller-diameter nozzle 52b. The coil 56 is disposed around the duct 52a for generating a magnetic field which moves from an area $H_1$ to an area $H_2$ (FIG. 5) when an electric current is passed through the coil 56.

Figure 6:
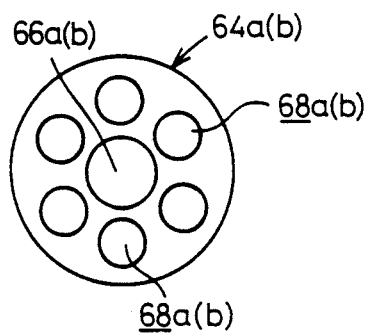
FIG. 6 is a front elevational view of a core holder in the electromagnetic pump shown in FIG. 5.

A pair of axially confronting core holders or support members 64a, 64b each having an outer profile substantially equal to the inner peripheral shape of the duct 52a and made of ceramic is fitted in the duct 52a. The core holders 64a, 64b have central axial projections 66a, 66b, respectively, and a plurality of circular through holes 68a, 68b (six through holes in each core holder in this embodiment) defined axially therethrough and equally angularly spaced around the central projections 66a, 66b, as shown in FIG. 6. The core holder 64a is held against a step or shoulder 52c disposed in the supply pipe 52 and axially positioned near the boundary between the duct 52a and the nozzle 52b. The core holder 64b is fixedly held in position against the axially end face of the outlet tube 50a.

The central projections 66a, 66b of the core holders 64a, 64b are fitted in the opposite ends of a core protection tube or pipe 70 made of ceramic. The core 54 comprising a cylinder made of a ferromagnetic material is disposed in the core protection tube 70. The core protection tube 70 and the core holders 64a, 64b are sealingly bonded together by a ceramic adhesive. The core 54 has opposite ends 54a, 54b to be borne and held by the confronting end faces of the respective projections 66a, 66b of the core holders 64a, 64b. A space 72 is defined diametrically between the core protection tube 70 and the duct 52a.

Small gaps or clearances are left diametrically between the core 54 and the core protection tube 70 and axially between the core 54 and the core holders 64a, 64b for absorbing expansion or contraction of these different members due to different coefficients of linear expansion thereof.

The supply pipe 52 and the mouthpiece 62 are heated to a predetermined temperature range (e.g., from 600° C. to 720° C.) by a heater (not shown) to keep the molten metal at a suitable temperature.

The projections 66a, 66b of the core holders 64a, 64b and the opposite ends of the core protection tube 70 may be fastened together by means of screws rather than the adhesive bonding.

The pressure-feed device with the electromagnetic pump thus incorporated will operate and has advantages as follows:

When an electric current is passed through the coil 56 of the electromagnetic pump 58, a magnetic field is generated by the coil 56 and moved from the area $H_1$ to the area $H_2$ in the direction of the arrow B. The molten metal flowing out of the furnace 50 and filled in the space 72 in the supply pipe 52 is fed in the direction of the arrow B under forces produced by the interaction of the moving magnetic field and an electric current induced in the molten metal. The molten metal is therefore delivered from the through holes 68a in the core holder 64a through the nozzle 52b and the mouthpiece 62 into the injection sleeve 60 of the casting machine.

At this time, the core 54 is subjected to propulsion forces in its axial direction, but remains substantially at rest or immovable since the opposite ends 54a, 54b of the core 54 are held by the confronting end faces of the projections 66a, 66b of the respective core holders 64a, 64b.

Dependent on the kind of the molten metal, the surfaces of some metallic components of the electromagnetic pump 58 may be eroded violently by the molten metal. If the molten metal were brought into direct contact with the surface of the core 54, the surface of the core 54 might be damaged or pitted.

According to the illustrated embodiment, the core 54 is protected by the simple core protection tube 70 and held in the duct 52a of the supply pipe 52 by the core holders 64a, 64b of simple configuration. Since the core 54 in its entirety is thus covered, sealed, and held in position by a small number of components, the cost of the electromagnetic pump 58 is greatly reduced. The core 54 is reliably protected from erosion which would otherwise be brought about by the molten metal.

The number of parts that the electromagnetic pump 58 is made up of is reduced. There are also fewer regions of the pressure-feed device which have to be sealed (only two regions, i.e., the opposite ends of the supply pipe 52 have to be sealed). Therefore, the pressure-feed device can be assembled and maintained with increased ease and efficiency.

When there is no molten metal in the space 72 in the supply pipe 52, the core 54 and the core protection tube 70 undergo cooling. Yet when there is molten metal in the space 72, the core 54 and the core protection tube 70 are heated by the molten metal. The core 54 and the core projection tube 70 are thus caused to undergo repeated cooling and heating cycles over a long period of time. In this embodiment, as described above, there are small gaps or clearances diametrically between the core 54 and the core protection tube 70 and axially between the core 54 and the core holders 64a, 64b. Consequently, even when these separate members are differentially expanded or contracted due to different coefficients of linear expansion thereof, the core protection tube 70 and the core holders 64a, 64b are prevented from being cracked.

Figure 7:
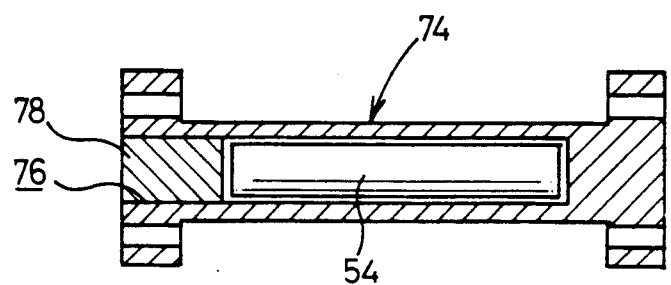
FIG. 7 is a cross-sectional view of an integral assembly of a core holder and a core protection tube according to another embodiment of the present invention.

FIG. 7 shows a core protection tube 74 in an electromagnetic pump according to another embodiment of the present invention. The core protection tube 74 is of an integral structure similar to the core holders 64a, 64b and the core protection tube 70 (FIG. 5) combined together. The core protection tube 74 has an opening 76 defined in one end thereof for insertion of the core 54 therethrough into the core protection tube 74. With the core 54 inserted in the core protection tube 74, the opening 76 is closed off by a detachable plug 78 to hold the core 54 in the core protection tube 74. The electromagnetic pump having the core protection tube 74 operates in the same manner and offers the same advantages as the electromagnetic pump 58 of the preceding embodiment.

Figure 8:
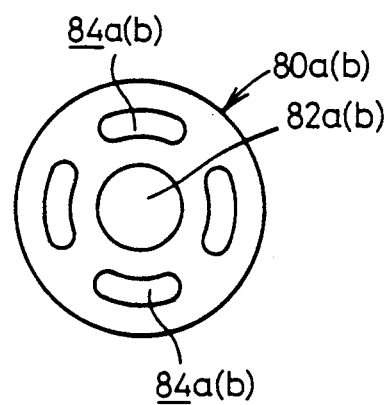
FIG. 8 is a front elevational view of a core holder having differently shaped through holes according to still another embodiment of the present invention.

Other core holders different from the core holders 64a, 64b shown in FIGS. 5 and 6 are illustrated in FIG. 8. The core holders 80a, 80b of FIG. 8 have a plurality of arcuate through holes 84a, 84b (four in each core holder) defined at equally angularly spaced intervals around central axial projections 82a, 82b, respectively. The arcuate through holes, 84a, 84b also operate in the same manner as the holes 68a, 68b shown in FIGS. 5 and 6.

Figure 9:
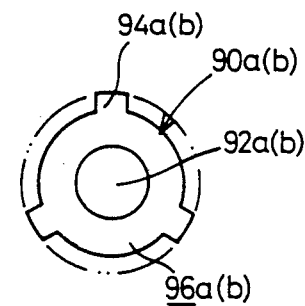
FIG. 9 is a front elevational view of a core holder in accordance with a further embodiment of the present invention.

The core holders may also be of other configurations apart from providing the through holes 64a, 64b and 84a, 84b. For example, core holders 90a, 90b shown in FIG. 9 may be employed. The core holders 90a, 90b have three radial arms 94a, 94b equally angularly spaced around central projections 92a, 92b and projecting radially outwardly. The radial arms 94a, 94b define openings or spaces 96a, 96b therebetween for allowing molten metal to flow therethrough.

Figure 10:
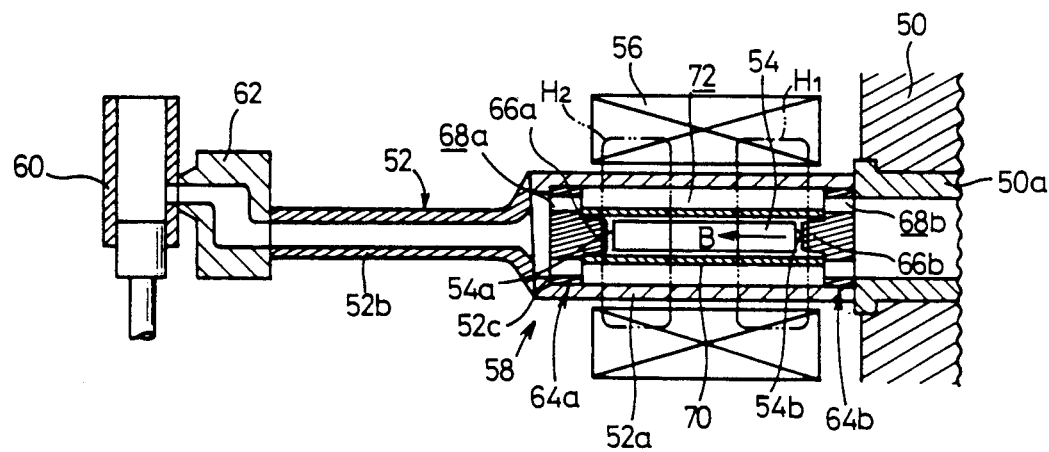
FIG. 10 is a fragmentary vertical cross-sectional view of a pressure-feed device including an electromagnetic pump according to a still further embodiment of the present invention.

In the embodiment shown in FIG. 5, the supply pipe 52 is integrally constructed of the duct 52a and the nozzle 52b. However, the duct 52a and the nozzle 52b may be separate from each other as shown in FIG. 10. Those parts shown in FIG. 10 which are identical to those of FIG. 5 are represented by identical reference characters, and will not be detail.

According to the present invention, as described above, the inner peripheral shape of the core protection tube is substantially identical to the outer profile of the core, and the opposite ends of the core are held by the confronting end faces of the support members by which the core protection tube is supported in the duct. With this arrangement, the electromagnetic pump is constructed of a small number of components which are of simple shape, and can be manufactured inexpensively. The regions which require sealing are minimized, and hence the problem of molten metal leakage is reduced. Moreover, the electromagnetic pump is assembled with ease and can be maintained efficiently.

Although certain preferred embodiments have been shown and described, it should be understood that many changes and modifications may be made therein without departing from the scope of the appended claims.

What is claimed is:

1. An electromagnetic pump comprising:
   a unitary cylindrical core made of a magnetic material;
   a core protection tube housing said cylindrical core for protecting the core from erosion by contact with molten metal;
   a duct accommodating said core protection tube, a space defined between said duct and said core protection tube;
   a coil disposed around said duct and energizable for generating a moving magnetic field to feed molten metal filed in said space; and
   a pair of support members supporting said core protection tube in said duct and having confronting end faces, respectively, for holding opposite ends of said core, said support members being fitted in said duct and having openings for passage of the molten metal therethrough and projections fitting, respectively, in opposite ends of said core protection tube, said core projection tube and said support members jointly defining a core storage region therebetween, said core being freely movably supported with gaps left axially and diametrically between said core and said core storage region.

2. An electromagnetic pump according to claim 1, wherein said core protection tube comprises a pipe with said space defined between the pipe and said duct.

3. An electromagnetic pump according to claim 1, wherein said core protection tube and said support members are made of ceramic.

4. An electromagnetic pump according to claim 1, further comprising a nozzle in contact with said duct wherein said nozzle is smaller in diameter than said duct and wherein said nozzle and said duct together define a supply pipe for passage of said molten material.

5. An electromagnetic pump according to claim 4, wherein said nozzle and said duct are constructed as a unitary structure.

6. An electromagnetic pump according to claim 2, wherein said support members comprise central axial projections and have a plurality of through holes defined axially therethrough and equally angularly spaced around said central axial projections.

7. An electromagnetic pump according to claim 2, wherein said support members comprise central axial projections and having equally angularly spaced radial arms disposed about said central axial projections.

8. An electromagnetic pump according to claim 6, wherein said through holes comprise circular openings.

9. An electromagnetic pump according to claim 6, wherein said through holes comprise arcuate openings.

10. An electromagnetic pump comprising:
a unitary cylindrical core made of a magnetic material;
a core protection tube housing said cylindrical core for protecting the core from erosion by contact with molten metal;
a duct accommodating said core protection tube, a space defined between said duct and said core protection tube;
a coil disposed around said duct and energizable for generating a moving magnetic field to feed molten metal filed in said space; and
a pair of support members supporting said core protection tube in said duct and having confronting end faces, respectively, for holding opposite ends of said core, said support members being fitted in said duct and having openings for passage of the molten metal therethrough and projections fitting, respectively, in opposite ends of said core protection tube, said core projection tube and said support members jointly defining a core storage region therebetween, said core being freely movably supported with gaps left axially and diametrically between said core and said core storage region.

11. An electromagnetic pump comprising:
an integrally formed cylindrical core made of a magnetic material;
a core protection tube housing said cylindrical core;
a duct accommodating said core protection tube with a space defined between said duct and said core protection tube;
a coil disposed around said duct and energizable for generating a moving magnetic field to propel molten metal filed in said space; and
a pair of support members fixedly disposed in said duct and having protections disposed in opposite ends of said core projection tube, said support members supporting said core projection tube in said duct, said core projection tube and said support members jointly defining a core storage region there between, said core being freely movably supported with gaps left axially and diametrically between said core and said core storage region, said projections having axial end surfaces disposed adjacent opposite ends of said core to retain said core in said core projection tube and to completely isolate said core from said space between said duct and said core projection tube such that molten metal propelled through said duct flows through said space and is completely out of contact with said core.

12. An electromagnetic pump comprising:
an integrally formed cylindrical core made of a magnetic material;
a core protection tube housing said cylindrical core;
a duct accommodating said core protection tube with a space defined between said duct and said core protection tube;
a coil disposed around said duct and energizable for generating a moving magnetic filed to propel molten metal filed in said space; and
a pair of support members fixedly disposed in said duct and having projections disposed in opposite ends of said core protection tube, said support members supporting said core protection tube in said duct, said core protection tube and said support members jointly defining a core storage region there between, said core being freely movably supported with gaps left axially or diametrically between said core and said core storage region, said projections having axial end surfaces disposed adjacent opposite ends of said core to retain said core in said core protection tube and to completely isolate said core from said space between said duct and said core protection tube such that molten metal propelled through said duct flows through said space and is completely out of contact with said core.

13. An electromagnetic pump comprising:
a unitary cylindrical core made of a magnetic materials;
a core protection tube having open opposite ends housing said cylindrical core for protecting the core from erosion by contact with molten metal;
a duct accommodate said core protection tube with a space defined between said duct and said core protection tube;
a coil disposed around said duct and energizable for generating a moving magnetic field to feed molten metal filled in said space; and
a pair of support members fitted in said duct and having openings for passage of the molten metal therethrough, said support members supporting said core protection tube in said duct and having confronting projections disposed in said opposite ends of said core protection tube, said core protection tube and said support members jointly defining a core storage region there between with gaps left axially and diametrically between said core and said core storage region such that said core is slightly movable within said core storage region and substantially immovable with respect to said duct.

14. An electromagnetic pump comprising:

a unitary cylindrical core made of a magnetic materials;

a core protection tube having open opposite ends housing said cylindrical core for protecting the core from erosion by contact with molten metal;

a duct accommodate said core protection tube with a space defined between said duct and said core protection tube;

a coil disposed around said duct and energizable for generating a moving magnetic field to feed molten metal filled in said space; and a pair of support members fitted in said duct and having openings for passage of the molten metal therethrough, said support members supporting said core protection tube in said duct and having confronting projections disposed in said opposite ends of said core protection tube, said core protection tube and said support members jointly defining a core storage region there between with gaps left axially or diametrically between said core and said core storage region such that said core is slightly movable within said core storage region and substantially immovable with respect to said duct.

15. An electromagnetic pump comprising:

a cylindrical core made of a magnetic materials;

a core protection tube housing said cylindrical core for protecting the core from erosion by contact with molten metal;

a duct accommodating said core protection tube with a space defined between said duct and said core protection tube;

a coil disposed around said duct and energizable for generating a moving magnetic field to feed molten metal filled in said space; and a pair of support members support said core protection tube in said duct and having confronting end faces, respectively, for holding opposite ends of said core, wherein said core projection tube and said support members are integrally constructed as a unitary structure, said unitary structure having an opening defined in an end thereof corresponding to one of said support members for passage therethrough of said core, and further including a plug detachably mounted in said opening.

16. An electromagnetic pump according to claim 15, wherein said core protection tube, said support members, and said plug jointly define a core storage region therebetween, with gaps left axially and diametrically between said core and said core storage region.

17. An electromagnetic pump according to claim 15, wherein said core protection tube, said support members, and said plug jointly define a core storage region therebetween, with gaps left axially or diametrically between said core and said core storage region.

* * * * *